March 23, 1965  A. FISCHER  3,174,387
EXPANSION BOLT
Filed June 4, 1962

INVENTOR:
ARTUR FISCHER
BY
Michael S. Striker
ATTORNEY

United States Patent Office 3,174,387
Patented Mar. 23, 1965

3,174,387
EXPANSION BOLT
Artur Fischer, Tumlingen, Kreis Freudenstadt, Germany
Filed June 4, 1962, Ser. No. 199,879
1 Claim. (Cl. 85—71)

The present invention relates to fastening devices. More particularly, the invention relates to an expansion bolt which is especially suited for securing one or more objects to apertured walls consisting of comparatively brittle material incapable of properly retaining a screw or a similar threaded member. Still more particularly, the invention relates to an expansion bolt which is capable of securing objects to comparatively thin walls having an exposed side and a concealed side so that a fastening device utilizing washers at both sides of the wall cannot be applied.

An important object of the invention is to provide a very simple and reliable expansion bolt which is a one-piece structure and which may be mass-manufactured at very low cost.

Another object of the invention is to provide an expansion bolt of the just outlined characteristics which can be applied by skilled or unskilled persons, and which is automatically held against rotation with respect to a wall when the customary spreading or deforming screw which cooperates therewith is being driven home.

A further object of the invention is to provide an expansion bolt which is constructed and assembled in such a way that, while certain of its portions are readily deformable to insure proper retention of the bolt, the remaining portions thereof are sufficiently rigid to prevent withdrawal of the bolt once the screw is driven home.

An additional object of the invention is to provide an expansion bolt of the above outlined characteristics which may be manufactured in any desired size and which is constructed and assembled in such a way that it may be permanently retained in the wall even if the screw is withdrawn.

A further object of the invention is to provide an expansion bolt which can properly secure one or more objects to an apertured wall even though it need not be provided with metallic springs, pivotally connected wall-engaging elements and similar cost-increasing attachments.

A concomitant object of the invention is to provide an expansion bolt which consists of corrosion-resistant material, and which is equally useful in connection with metal screws or wood screws.

With the above objects in view, the invention resides in the provision of an expansion bolt which comprises a first tubular section receivable in the aperture of a brittle wall or the like, an internally threaded second tubular section which is coaxial with the first tubular section and which extends beyond the concealed side of the wall when the bolt is properly inserted into the wall, and a plurality of radially outwardly deformable ribs whose end portions are integral with the two tubular sections and whose thickness preferably diminishes in a direction from the second tubular section toward the first tubular section. The median portions of the ribs may be deformed into at least partial abutment with the concealed side of the wall when a screw or a similar threaded member is introduced through the first tubular section to mesh with the second tubular section and when the screw is thereupon rotated in a sense to move one of the tubular sections toward the other tubular section.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a partly elevational and partly sectional view of an expansion bolt which embodies one form of my invention, the bolt being shown in partly expanded position and being utilized for securing a plate-like object to the outer side of a brittle wall or the like;

Figure 1:
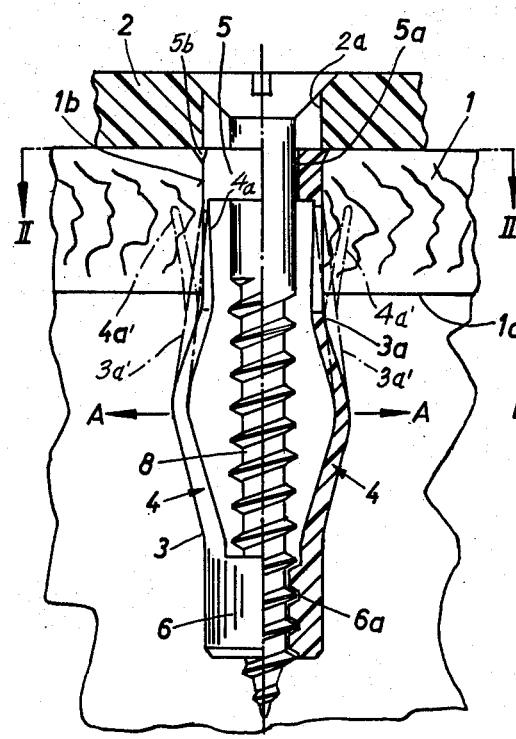
Figure 2:
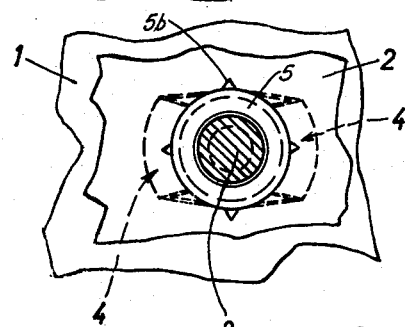
FIG. 2 is a transverse section as seen in the direction of arrows from the line II—II of FIG. 1.

Referring now in greater detail to the illustrated embodiments, and first to FIGS. 1 and 2, there is shown an expansion bolt which is utilized for securing a plate-like object 2 to the outer side of an apertured wall 1. This wall is comparatively thin and consists of rather brittle material, e.g. plaster, so that a screw driven directly into the cylindrical aperture 1b could not properly retain the object 2. It is assumed that the inner side 1a of the wall 1 is not accessible, for example, because the wall 1 constitutes the ceiling of a room and the inner side 1a is the concealed upper side of the ceiling.

The improved expansion bolt is a one-piece article which consists of tough, elastically deformable corrosion- and creep-resistant synthetic plastic material. It comprises a first tubular section 5 which fits, preferably with some friction, into the aperture 1a and whose cylindrical peripheral surface is provided with radially outwardly extending rotation-preventing teeth 5b adapted to penetrate into the material of the wall 1 and to hold the tubular section 5 against angular movements. The bolt further comprises a second tubular section or head 6 which is formed with a cylindrical peripheral surface having a diameter less than the diameter of the aperture 1b so that the tubular section 6 may be caused to pass through this aperture and beyond the inner side 1a of the wall until the aperture 1b accommodates the tubular section 5. It will be noted that the two tubular sections 5, 6 are coaxial and that the tubular section 6 is provided with internal threads 6a of the wood screw type adapted to mesh with external threads on a wood screw 8 which is introduced through the bore 2a of the object 2 and through the bore 5a of the tubular section 5. The two tubular sections are connected by the respective end portions 3, 3a of two elongated ribs 4 which are deformable radially outwardly with respect to the axis of the expansion bolt and whose cross-sectional areas (i.e. thicknesses) diminish preferably gradually in a direction from the tubular section 6 toward the tubular section 5. In other words, the end portions 3 of greater thickness are integral with the tubular section 6, and the end portions 3a of reduced thickness are integral with the tubular section 5. The advantage of ribs which taper toward the tubular section 5 is that they may be readily deformed radially outwardly when the screw 8 is driven home, i.e. when the screw 8 is rotated in a sense to move the tubular section 6 toward the tubular section 5 whereby the median portions of the ribs 4 may be expanded and deformed all the way into actual abutment with the inner side 1a of the wall 1 to thereby prevent axial displacements of the expansion bolt in upward direction, as viewed in FIG. 1.

FIG. 2 shows that the tubular section may be provided with say four equidistant rotation-preventing teeth 5b and that the expansion bolt comprises two ribs 4.

Figure 3:
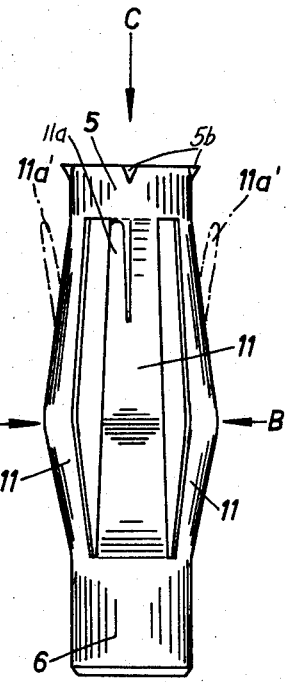
FIG. 3 is a side elevational view of a slightly different bolt showing its four equidistant ribs in a position they assume before deformation.

FIG. 3 illustrates a modified expansion bolt before insertion into a wall. It will be noted that the median portions of the four ribs 11 normally project radially outwardly beyond the outlines of the tubular sections 5, 6 so that, in order that the bolt of FIG. 3 may be caused to pass through the aperture 1b (arrow C) the median portions of the ribs 11 must be deformed radially inwardly in directions indicated by the arrows B whereby the diameter of the ribbed central section of the bolt is reduced to the diameter of the aperture 1a. Once they pass beyond the aperture 1b and beyond the inner side 1a of the wall 1, the median portions of the ribs 11 expand radially outwardly (see the arrows A in FIG. 1), and such radial expansion of the ribs is continued when the screw 8 is rotated in a sense to move the tubular section 6 toward the tubular section 5.

Each rib 4 or 11 of the bolt shown in FIG. 1 or 3 is preferably provided with one or more wall-engaging projections in the form of elongated tongues 4a or 11a whose tips are adjacent to the tubular section 5 and whose leading ends are integral with the median portions of the respective ribs. In the embodiments of FIGS. 1 and 3, each rib 4 or 11 is provided with a single tongue 4a or 11a, and the free ends or tips of these tongues extend into the aperture 1b when the expansion bolt is properly inserted into the wall. When the screw 8 is drawn tight (that is, when the tubular section 6 is caused to move toward the tubular section 5), the tips of the tongues 4a or 11a expand and penetrate into the material of the wall 1 to contribute to the retaining action and to simultaneously assist the teeth 5b in preventing rotation of the tubular section 5. Such positions of the tongues 4a, 11a are indicated in phantom lines by reference numerals 4', 11a'.

Figure 4:
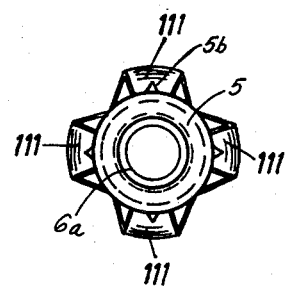
FIG. 4 is an end view of a modified expansion bolt whose ribs are without wall-engaging projections.

The provision of tongues is an optional feature of my invention, and it will be noted that the ribs 111 on the expansion bolt of FIG. 4 are without such tongues.

While I have shown and illustrated an expansion bolt which consists of a synthetic plastic substance, it is equally possible to make this bolt of metallic material which must be deformable in response to movement of the tubular section 6 toward the tubular section 5.

It will be noted that the diameter of the bore 5a in the tubular section 5 is greater than the smallest diameter of threads 6a. In other words, the screw 8 may pass freely through the bore 5a.

Owing to the fact that the ribs taper toward the tubular section 5, the upper portions of the ribs 4, as viewed in FIG. 1, will be expanded into full face-to-face abutment with the inner side 1a of the wall 1 if the screw 8 is driven home. The plane in which the ribs begin to spread is indicated by the common plane of the arrows A, A. An important advantage of ribs which are thicker at the tubular section 6 is that they prevent withdrawal of the expansion bolt from the wall 1 since the thicker end portions 3 are not likely to break away in response to axial forces. In addition such comparatively strong end portions 3 compel the weaker end portions 3a to actually penetrate into the material of the wall 1 and to insure that the bolt is properly anchored when the screw 8 draws the tubular section 6 toward the tubular section 5. The manner in which the end portions 3a begin to spread radially outwardly when the tubular section 6 starts to move upwardly (as viewed in FIG. 1) is indicated in phantom lines at 3a'. Of course, the radially outwardly deformed end portions 3a' assist the projections 4a and the teeth 5b in preventing rotation of the tubular section 5 in the aperture 1b.

In order to facilitate deformation of the ribbed central bolt section, each rib is preferably formed with a concave inner side and with a convex outer side.

It should be understood that the tubular section 6 may be provided with other types of threads to cooperate with metal screws.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

An expansion bolt, particularly for securing an object to the outer side of an apertured wall which consists of comparatively brittle material, said expansion bolt comprising a first tubular section having a peripheral surface provided with rotation-preventing teeth which is receivable in the aperture of the wall; a second tubular section which extends beyond the wall when the first tubular section is received in the aperture of the wall, said second tubular section coaxial with said first tubular section and having internal threads adapted to mesh with external threads of a screw when such a screw is introduced through said first tubular section; and a plurality of deformable elongated ribs extending between and having end portions integral with said tubular sections, said ribs further comprising median portions which normally extend radially outwardly beyond the outlines of said tubular sections and which are deformed radially inwardly when said portions are introduced through said aperture and then automatically expand radially outwardly so that the bolt is contained in said aperture, said portions being deformed to extend further radially outwardly when a screw passing through the first tubular section and meshing with the second tubular section is rotated in a sense to move said second tubular section toward said first tubular section, the cross-sectional area of each of said ribs continuously diminishing in a direction from said second tubular section toward said first tubular section and each of said ribs having at least one wall engaging projection comprising an elongated tongue having a free end adjacent to said first tubular section and a second end spaced from said first tubular section and integral with said rib.

References Cited by the Examiner
UNITED STATES PATENTS

| | | | |
|---|---|---|---|
| 1,295,734 | 2/19 | Greubel | 85—71 |
| 2,017,421 | 10/35 | Post | 85—71 |
| 2,255,650 | 9/41 | Burke | 85—83 |
| 2,887,926 | 5/59 | Edwards | 85—70 |
| 2,913,953 | 11/59 | Tendler | 85—71 |
| 2,914,106 | 11/59 | Boyd | 85—70 |
| 2,918,841 | 12/59 | Poupitch | 85—71 |

EDWARD C. ALLEN, *Primary Examiner.*